United States Patent [19]

Longuet

[11] 4,289,734
[45] Sep. 15, 1981

[54] APPARATUS FOR CONTACTING SOLIDS WITH A LIQUID

[75] Inventor: Andre Longuet, Bethune, France

[73] Assignee: Fives-Cail Babcock, Paris, France

[21] Appl. No.: 193,925

[22] Filed: Oct. 6, 1980

[30] Foreign Application Priority Data

Oct. 4, 1979 [FR] France .............................. 79 24674

[51] Int. Cl.³ .................... B01D 11/02; C13D 1/12
[52] U.S. Cl. ..................................... 422/272; 127/45; 134/69; 165/111; 366/228
[58] Field of Search ............... 422/270, 271, 272; 127/6, 45; 134/60, 65, 69, 159; 165/111; 366/228

[56] References Cited

U.S. PATENT DOCUMENTS

| | | | |
|---|---|---|---|
| 2,012,298 | 8/1935 | Berge | 422/271 X |
| 2,337,137 | 12/1943 | Thompson et al. | 422/272 X |
| 2,433,552 | 12/1947 | Haney et al. | 422/272 X |
| 2,569,199 | 9/1951 | Smet | 422/272 X |
| 2,998,307 | 8/1961 | Walker | 422/272 X |
| 3,297,410 | 1/1967 | De Lisle | 422/272 X |
| 3,660,042 | 5/1972 | Duchateau et al. | 127/6 X |
| 3,809,538 | 5/1974 | Duchateau | 422/272 |
| 3,930,801 | 1/1976 | Pinet | 422/270 |
| 4,049,386 | 9/1977 | Gillain | 127/45 X |

FOREIGN PATENT DOCUMENTS 136683  8/1960  U.S.S.R. .............................. 127/6

Primary Examiner—Frank W. Lutter
Assistant Examiner—Roger F. Phillips
Attorney, Agent, or Firm—Kurt Kelman

[57] ABSTRACT

Apparatus for countercurrently contacting solids with a liquid comprises a rotatable drum housing a screw conveyor having helical turns affixed to the cylindrical side wall of the drum and defining a helical passageway for the solids between the turns, the passageway is divided into a series of compartments. Each compartment has a grating receiving the solids and raising the received solids while liquid is drained through the grating and then permitting the drained solids to fall into a succeeding compartment, and an imperforate partition trailing the grating in the direction of rotation of the drum, the partition defining a chamber receiving the liquid drained from the solids with the adjacent side wall of the drum and the helical screw turns. A passageway interconnects each chamber with the upstream compartment and these passageways extend along the side wall of the drum. Each passageway communicates with the upstream compartment it feeds through openings in a trailing part thereof and through orifices in a leading part thereof, the leading part adjoining the imperforate partition. A perforate dike defines the orifices and is arranged in the leading part. The dike is disposed approximately in the median plane of the compartment and extends transversely to the axis of the drum.

6 Claims, 6 Drawing Figures

APPARATUS FOR CONTACTING SOLIDS WITH A LIQUID

The present invention relates to improvements in apparatus for contacting solids with a liquid, for example for the purpose of heat exchange therebetween or extraction. Known apparatus of this type comprises a drum rotatable about a substantially horizontal axis, i.e. an axis extending horizontally and being slightly inclined from the horizontal, and having a cylindrical side wall and two closed end walls, the drum walls defining an interior chamber, the solids being delivered into the interior chamber through one of the end walls and the liquid being delivered thereinto through the other end wall. A screw conveyor is arranged in the interior chamber for continuously conveying the solids from the one end wall towards the other end wall upon rotatin of the drum while the liquid flows countercurrently thereto, the screw conveyor having helical turns affixed to the cylindrical side wall of the drum and defining a helical passageway for the solids between the helical conveyor turns. Means for raising the solids and draining the solids during rotation of the drum is spaced along the helical passageway and divides the passageway into a series of compartments. Each solids raising and draining means includes a grating receiving the solids and raising the received solids while liquid is drained through the grating and then permitting the drained solids to fall into a succeeding one of the compartments, and an imperforate partition trailing the grating in the direction of rotation of the drum, the partition having an inner end adjacent the axis of the drum and defining a chamber receiving the liquid drained from the solids with the adjacent side wall of the drum and the helical screw turns. A passageway interconnects each of the chambers with the compartment upstream of the chamber in the direction of movement of the solids from the one to the other drum end wall.

An apparatus of this general type has been disclosed in U.S. Pat. No. 3,660,042, dated May 2, 1972.

It is the primary object of this invention to improve the exchange between the solids and the liquid by assuring more complete drainage of the solids and a better distribution of the liquid in the mass of drained solids.

The above and other objects and accomplished according to the invention with passageways extending along the side wall of the drum. Each passageway communicates with the upstream compartment it feeds through openings in a trailing part thereof in the direction of rotation of the drum and through orifices in a leading part thereof in the direction or rotation of the drum rotation, the leading part adjoining the imperforate partition of the solids raising and draining means. A perforate dike defines the orifices and is arranged in the leading part. The dike is disposed approximately in the median plane of the compartment and extends transversely to the axis of the drum.

The above and other objects, advantages and features of the present invention will become more apparent from the following detailed description of a now preferred embodiment thereof, taken in conjunction with the accompanying schematic drawing wherein FIG. 1 shows a transverse sectional view of the apparatus, arcuate arrow R indicating the direction of rotation of the drum;

Figure 1:
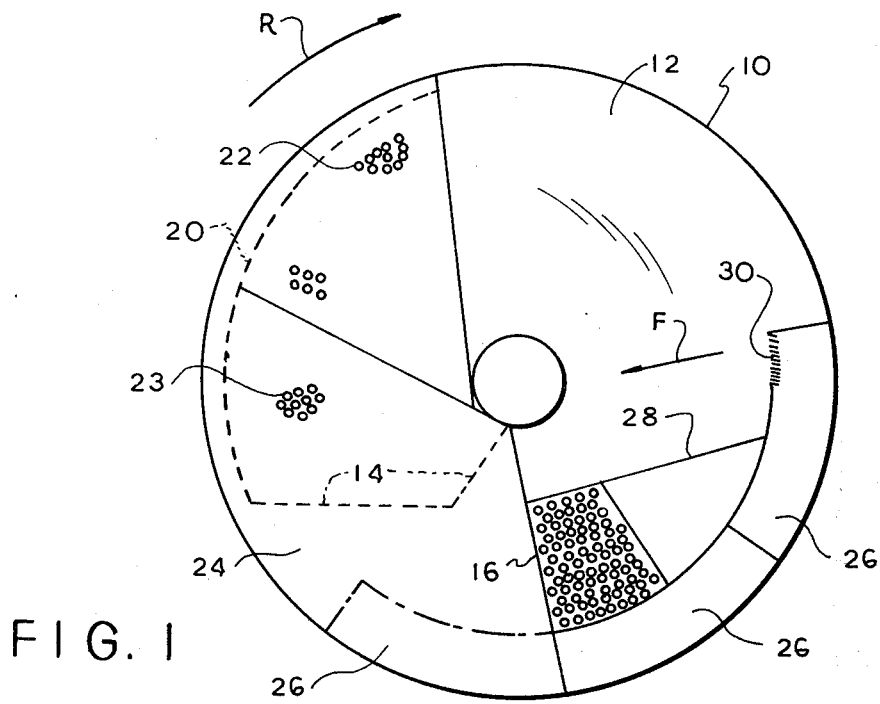

Referring now to the drawing, the apparatus is shown to comprise a drum rotatable about a horizontal or slightly inclined axis in a direction of rotation indicated by arrow F. The drum has imperforate cylindrical side wall 10 and two closed end walls defining an interior chamber. In a conventional manner, the solids are delivered into the interior chamber through one of the end walls and the liquid is delivered thereinto through the other end wall, suitable inlet and outlet ports being defined in the end walls for the liquid and the solids, respectively. As is also conventional, the cylindrical wall of the drum may be supported on rollers or any other suitable support means permitting the drum to be rotated and suitable entrainment means is arranged to rotate the drum. All of this being well known and obvious, the drawing has not been encumbered with an illustration thereof.

Figure 2:
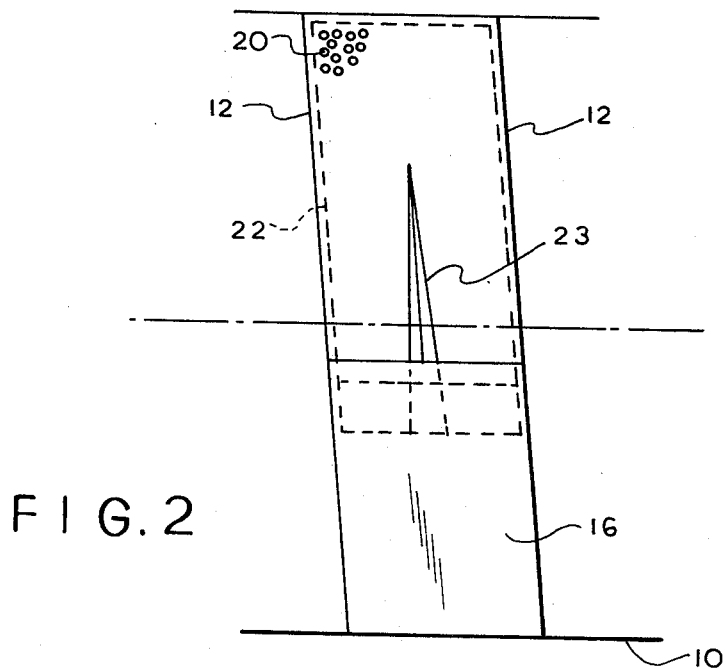
FIG. 2 is an end view taken in the direction of arrow F in FIG. 1, showing a draining basket of one compartment.
Figure 3:
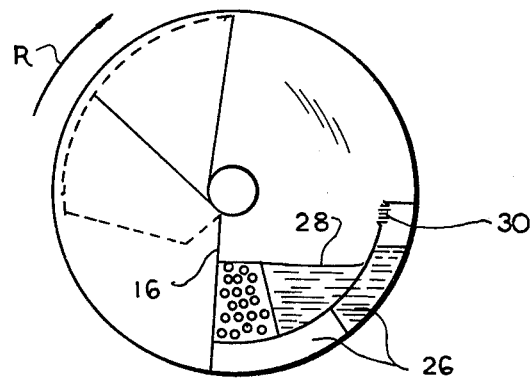
FIG. 3 to 5 are views analogous to that of FIG. 1, illustrating the flow of liquid in different rotational positions of the drum.
Figure 4:
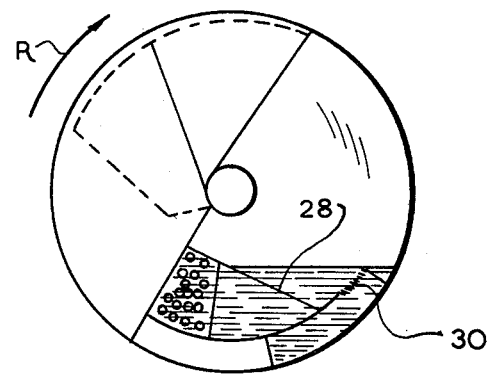
Figure 5:
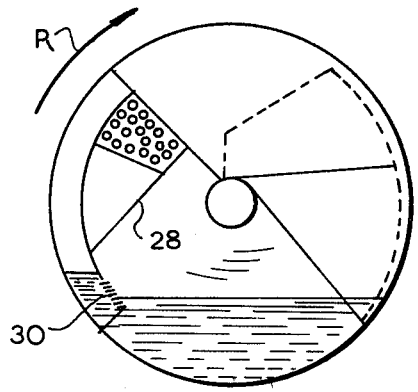

A screw conveyor is arranged in the interior chamber along the entire length of the drum for continuously conveying the solids from one end wall towards the other end wall upon rotation of the drum while the liquid flows countercurrently thereto. The screw conveyor has imperforate helical sheet metal turns 12 affixed to side wall 10 of the drum and defining a helical passageway for the solids between the helical conveyor turns 12. The outer rim of the conveyor turns is fluidtightly affixed to the side wall of the drum and the depth of the screw conveyor is less than the radius of the drum. Means for raising the solids and for draining the solids during rotation of the drum is spaced along regular intervals along the helical passageway and divide the passageway into a series of compartments. Each means for raising the solids and for draining the solids includes grating 14 receiving the solids and raising the received solids while liquid is drained through the grating and then permitting the drained solids to fall into a succeeding one of the compartments, as can be seen in FIGS. 3 to 5. It further includes imperforate partition 16 trailing grating 14 in the direction of rotation of the drum. The partition has an inner end adjacent the axis of the drum and defines chamber 24 receiving the liquid drained from the solids with the adjacent side wall of the drum and helical screw turns 12. As best shown in FIG. 2, the outer end of imperforate partition 16 is affixed in a fluidtight manner to side wall 10 of the drum and its sides are affixed in a fluidtight manner to ajacent ones of helical screw turns 12. The partitions extend in a chordal plane slightly spaced from the axis of the drum.

In the illustrated embodiment, grating 14 is composed of two parts enclosing an obtuse angle therebetween. Arcuate grating 20 extends along the side wall of the drum and is slightly spaced therefrom, one end thereof being affixed to side wall 12 and the grating being concentric with the cylindrical side wall of the drum about the axis thereof. A free end of one of the parts of grating 14 is affixed to the inner end of imperforate partition 16 and a free end of the other part of grating 14 is affixed to the other end of arcuate grating 20. Two perforate lateral walls 22, 22 connect the grating parts and the arcuate grating, the lateral walls being disposed, as shown in FIG. 2, along screw turns 12 and being slightly spaced therefrom. The rims of gratings 14 and 20 are slightly spaced from helical turns 12 of the conveyor screw. The grating parts, the arcuate grating and the lateral walls define a draining basket of large capacity. The ends of the lateral walls which are not affixed to the gratings are affixed to the screw turns.

In accordance with one preferred feature, the drainage surface is increased by arranging perforate septum 23 in the interior of the draining basket. The septum partitions the basket interior and extends transversely to the axis of the drum. As shown in FIG. 2, it has two perforated walls defining therebetween an interior chamber in communication with chamber 24 receiving the liquid drained from the solids. The two perforated sheet metal walls of septum 23 form a pointed dihedron.

Gratings 14 and associated partitions 16 define a series of successive compartments in the helical passageway and the solids pass through these compartments from the upstream end of the drum to the downstream end thereof while the liquid circulates therethrough countercurrently. During rotation of the drum, the solids contained in each compartment are raised by grating 14, drained and discharged into the succeeding compartment above the inner end of its partition 16. Meanwhile, the liquid drained from the raised solids is received in chambers 24.

Passageways 26 interconnects each chamber 24 with the compartment upstream of the chamber in the direction of movement of the solids from the one to the other end wall, the passageways extending along the side wall of the drum. The passageway extends over the entire axial width of the upstream compartment it feeds and its width measured along side wall 12 of the drum is substantially equal to the corresponding dimension of the chamber to which it is connected.

Figure 6:
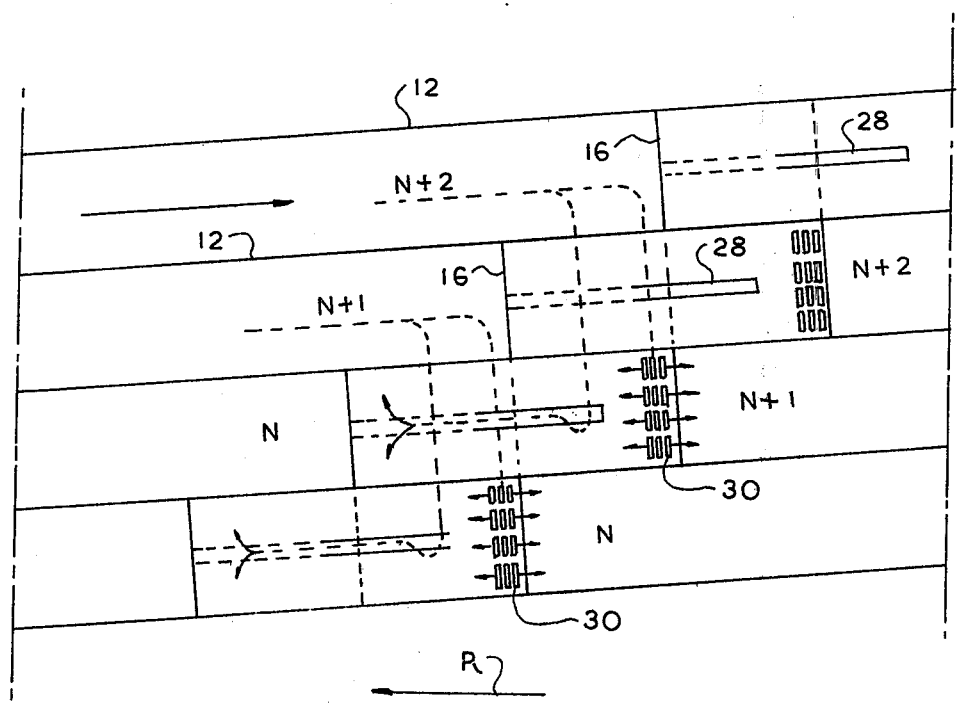
FIG. 6 is a developed view of a portion of the interior chamber of the drum.

In the illustrated embodiment, the compartments constituted by the solids raising and draining means 14, 16 are offset from each other by an angle exceeding 360°, that is, partitions 16 are displaced along the helical passageway defined by the screw turns by more than 360°, so that each passageway 26 beginning from the downstream end of a compartment passes through the upstream end of the compartment before it reaches the upstream end of the preceding compartment, where it ends, in the direction of movement of the solids through the drum. In the preceding compartment, passageways 26 extend in an axial direction over the entire width of the compartment. This disposition is visible in FIG. 6 where the direction of movement of the solids has been indicated by an arrow in solid lines while the direction of circulation of the liquid has been indicated by arrows shown in broken lines.

Each passageway 26 communicates with the upstream compartment it feeds through openings 30 in a trailing part thereof in the direction of rotation of the drum and through orifices in a leading part thereof in the direction of rotation of the drum, the leading part adjoining imperforate partition 16. Perforate dike 28 defines the orifices and is arranged to the leading part, being disposed approximately in the median plane of the compartment and extending transversely to the axis of the drum. Dike 28 is hollow and constituted by two sheet metal elements forming a pointed dihedron and affixed to partition 16. The interior wall of passageways 26 traverses the compartment and ends there. The interior of dike 28 communicates with the leading part of passageway 26, in the direction of rotation of the drum, and ends at the compartment. The wall of the leading end of the dike adjoining partition 16 is perforated to define the orifices. The interior wall of the trailing part of the passageway is peforated to define openings 30 which are equipped with deflecting elements (see FIG. 1).

As will be appreciated from FIGS. 3 to 5, which show successive operational stages of the rotating drum, the liquid carried through passageways 26 is first introduced into the compartments through the orifices in the leading part of dike 28 (FIG. 3), then simultaneously through openings 30 (FIG. 4) and finally solely through openings 30 (FIG. 5).

In operation (see FIG. 6), the drum is continuously rotated in the direction of arrow R and solids contained in any compartment n enters into the basket in this compartment and is raised by grating 14 until continuous rotation of the drum causes the solids to be dischaged into the succeeding compartment n+1 above partition 16. This raising and discharge of the solids continues progressively and the liquid coming from compartment n+2 flows through passgeway 26 and enters preceding compartment n+1 through the orifices in the perforated portion of dike 28, that is in the zone where the solids fall and are distributed to either side of dike 28 (see FIG. 3).

In view of the continuous rotation of the drum, the passageway 26 is progressively filled with liquid and when the solids reach the level of the trailing part of this passageway, the passageway is completely filled and the liquid penetrates the compartment simultaneously through the orifices in dike 28 and through openings 30 (FIG. 4). In this manner, the liquid is distributed through the entire mass of solids and a very homogenous mixture of solids and liquid is, therefore, obtained. When the perforated part of dike 28 emerges from the mass of solids, the liquid flows only through openings 30 until chamber 24 of compartment n+2 has been completely emptied. The deflectors at openings 30 are so oriented that they prevent the solids from entering passageways 26.

The apparatus may be used, for example, for thermal exchange between solids and a liquid, for instance to heat beetroots before they are fed to a diffuser by means of sugar juice coming from the diffuser, or for extracting a soluble component of a solid material by means of a liquid solvent, for instance for extracting sugar from sugar beets.

While the present invention has been described in connection with a now preferred embodiment thereof, it will be understood that modifications and variations of the disclosed structures functioning in an equivalent manner may occur to those skilled in the art without departing from the spirit and scope of this invention as defined in the appended claims.

What is claimed is:

1. An apparatus for contacting solids with a liquid, which comprises
    (a) a drum rotatable about a substantially horizontal axis in a direction of rotation and having a cylindrical side wall and two closed end walls, the drum walls defining an interior chamber, the solids being delivered into the interior chamber through one of the end walls and the liquid being delivered thereinto through the other end wall,
    (b) a screw conveyor arranged in the interior chamber for continuously conveying the solids from the one end wall towards the other end wall upon rotation of the drum while the liquid flows countercurrently thereto, the screw conveyor having helical turns affixed to the cylindrical side wall of the drum and defining a helical passageway for the solids between the helical conveyor turns, (c) means for raising the solids and for draining the solids during rotation of the drum, said means being spaced along the helical passageway and dividing the passageway into a series of compartments, each of the solids raising and draining means including (1) a grating receiving the solids and raising the received solids while liquid is drained through the grating and then permitting the drained solids to fall into a succeeding one of the compartments, and (2) an imperforate partition trailing the grating in the direction of rotation of the drum, the partition having an inner end adjacent the axis of the drum and defining a chamber receiving the liquid drained from the solids with the adjacent side wall of the drum and the helical screw turns, and (d) a passageway interconnecting each of said chambers with the compartment upstream of the chamber in the direction of movement of the solids from the one to the other end wall, the passageways extending along the side wall of the drum, and each passageway communicating with the upstream compartment it feeds through openings in a trailing part thereof in the direction of rotation of the drum and through orifices in a leading part thereof in the direction of drum rotation, the leading part adjoining the imperforate partition of the solids raising and draining means, (1) a perforate dike defining the orifices, the dike being arranged in the leading part and being disposed approximately in the median plane of the compartment and extending transversely to the axis of the drum.

2. The apparatus of claim 1, wherein each passageway extends over the entire axial width of the upstream compartment it feeds.

3. The apparatus of claim 1 or 2, wherein the width of each passageway measured along the side wall of the drum is substantially equal to the corresponding dimension of the chamber to which it is connected.

4. The apparatus of claim 1 or 2, wherein the compartments constituted by the solids raising and draining means are offset from each other by an angle exceeding 360° and, in the direction of movement of the solids, each passageway beginning from the downstream end of a compartment passes through the upstream end of the compartment and ends at the upstream end of the preceding compartment.

5. The apparatus of claim 1 or 2, wherein the grating is composed or two parts enclosing an obtuse angle therebetween, and further comprising an arcuate grating extending the length of the drum and slightly spaced therefrom, one of the grating parts being affixed to the inner end of the imperforate partition and the other grating part being affixed to the arcuate grating, and two perforated lateral walls connecting the grating parts and the arcuate grating, the lateral walls being disposed along the screw turns and being slightly spaced therefrom, the grating parts, the arcuate grating and the lateral walls defining a draining basket of large capacity.

6. The apparatus of claim 5, further comprising a perforate septum partitioning the interior of the draining basket, the septum extending transversely to the axis of the drum and having two perforated walls defining therebetween an interior chamber in communication with the chamber receiving the liquid drained from the solids.

* * * * *